United States Patent
Shankar D H et al.

(10) Patent No.: US 11,593,221 B2
(45) Date of Patent: Feb. 28, 2023

(54) METHODS AND SYSTEMS FOR DETERMINING BACKUP SCHEDULES

(71) Applicant: EMC IP Holding Company LLC, Hopkinton, MA (US)

(72) Inventors: Swaroop Shankar D H, Bangalore (IN); Chetan Battal, Bangalore (IN); Mahesh Reddy Appireddygari Venkataramana, Bangalore (IN); Shelesh Chopra, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 170 days.

(21) Appl. No.: 16/805,149

(22) Filed: Feb. 28, 2020

(65) Prior Publication Data
US 2021/0271560 A1  Sep. 2, 2021

(51) Int. Cl.
*G06F 11/14* (2006.01)
*G06F 11/07* (2006.01)

(52) U.S. Cl.
CPC ........ *G06F 11/1461* (2013.01); *G06F 11/076* (2013.01); *G06F 11/0772* (2013.01);
(Continued)

(58) Field of Classification Search
CPC .. G06F 11/008; G06F 11/0754; G06F 11/076; G06F 11/0772; G06F 11/0778; G06F 11/0793; G06F 11/1461; G06F 11/1466; G06F 11/3466; G06F 11/3476; G06F 11/3636; G06F 3/0614; G06F 3/0616; G06F 3/0617; G06F 3/0619; G06F 11/1464; G06F 2201/81
See application file for complete search history.

(56) References Cited

U.S. PATENT DOCUMENTS

| | | | |
|---|---|---|---|
| 8,880,941 B1 * | 11/2014 | Reiss ................. | G06F 11/1464 714/15 |
| 2010/0088494 A1 * | 4/2010 | Elnozahy ............ | G06F 11/1438 712/228 |

(Continued)

OTHER PUBLICATIONS

M. Chtepen, F. H. A. Claeys, B. Dhoedt, F. De Turek, P. Demeester and P. A. Vanrolleghem, "Adaptive Task Checkpointing and Replication: Toward Efficient Fault-Tolerant Grids," in IEEE Transactions on Parallel and Distributed Systems, vol. 20, No. 2, pp. 180-190, Feb. 2009, doi: 10.1109/TPDS.2008.93. (Year: 2009).*

*Primary Examiner* — Bryce P Bonzo
*Assistant Examiner* — Albert Li
(74) *Attorney, Agent, or Firm* — Chamberlain, Hrdlicka, White, Williams & Aughtry (57) ABSTRACT

A method for generating a backup schedule, that includes receiving, by a scheduling agent, an event entry specifying an event associated with a container, determining that the event entry specifies an alert event, adding the event entry to a plurality of historical event entries in a historical event repository, determining that the plurality of historical event entries indicates a repeating error state of the container, determining that an error frequency of the repeating error state is greater than an existing backup frequency of a container backup schedule, and generating a backup schedule warning indicating a recommended backup frequency.

18 Claims, 6 Drawing Sheets

(52) U.S. Cl.
CPC ...... *G06F 11/0778* (2013.01); *G06F 11/1464* (2013.01); *G06F 2201/81* (2013.01)

(56) References Cited

U.S. PATENT DOCUMENTS

| | | | | |
|---|---|---|---|---|
| 2015/0134899 A1* | 5/2015 | Cudak | ................ | G06F 11/1461 |
| | | | | 711/112 |
| 2016/0034362 A1* | 2/2016 | Al-Wahabi | .......... | G06F 11/1461 |
| | | | | 714/4.1 |
| 2016/0350173 A1* | 12/2016 | Ahad | ................. | G06F 11/0751 |
| 2017/0010941 A1* | 1/2017 | Shimada | ................ | G06F 11/00 |
| 2018/0314600 A1* | 11/2018 | Mori | ................... | G06F 11/1456 |
| 2019/0278663 A1* | 9/2019 | Mehta | .................... | G06F 3/067 |
| 2020/0092334 A1* | 3/2020 | Hiebert | .............. | G06F 11/1461 |
| 2021/0049075 A1* | 2/2021 | Gibbons, Jr. | ....... | G06F 11/1469 |

* cited by examiner

METHODS AND SYSTEMS FOR DETERMINING BACKUP SCHEDULES

BACKGROUND

Devices and/or components of devices are often capable of performing certain functionalities that other devices and/or components are not configured to perform and/or are not capable of performing. In such scenarios, it may be desirable to adapt one or more systems to enhance the functionalities of devices and/or components that cannot perform the one or more functionalities.

SUMMARY

In general, in one aspect, the invention relates to a method for generating a backup schedule, that includes receiving, by a scheduling agent, an event entry specifying an event associated with a container, determining that the event entry specifies an alert event, adding the event entry to a plurality of historical event entries in a historical event repository, determining that the plurality of historical event entries indicates a repeating error state of the container, determining that an error frequency of the repeating error state is greater than an existing backup frequency of a container backup schedule, and generating a backup schedule warning indicating a recommended backup frequency.

In general, in one aspect, the invention relates to a non-transitory computer readable medium that includes instructions which, when executed by a computer processor, enables the computer processor to perform a method for generating a backup schedule, that includes receiving, by a scheduling agent, an event entry specifying an event associated with a container, determining that the event entry specifies an alert event, adding the event entry to a plurality of historical event entries in a historical event repository, determining that the plurality of historical event entries indicates a repeating error state of the container, determining that an error frequency of the repeating error state is greater than an existing backup frequency of a container backup schedule, and generating a backup schedule warning indicating a recommended backup frequency.

In general, in one aspect, the invention relates to a backup manager that includes memory, and a processor, where the processor is configured to perform a method that includes receiving, by a scheduling agent, an event entry specifying an event associated with a container, determining that the event entry specifies an alert event, adding the event entry to a plurality of historical event entries in a historical event repository, determining that the plurality of historical event entries indicates a repeating error state of the container, determining that an error frequency of the repeating error state is greater than an existing backup frequency of a container backup schedule, and generating a backup schedule warning indicating a recommended backup frequency.

Other aspects of the invention will be apparent from the following description and the appended claims.

DETAILED DESCRIPTION

Specific embodiments will now be described with reference to the accompanying figures. In the following description, numerous details are set forth as examples of the invention. One of ordinary skill in the art, having the benefit of this detailed description, would appreciate that one or more embodiments of the present invention may be practiced without these specific details and that numerous variations or modifications may be possible without departing from the scope of the invention. Certain details known to those of ordinary skill in the art may be omitted to avoid obscuring the description.

In the following description of the figures, any component described with regard to a figure, in various embodiments of the invention, may be equivalent to one or more like-named components shown and/or described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments of the invention, any description of any component of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the term 'operatively connected', or 'operative connection', means that there exists between elements/components/devices a direct or indirect connection that allows the elements to interact with one another in some way (e.g., via the exchange of information). For example, the phrase 'operatively connected' may refer to any direct (e.g., wired or wireless connection directly between two devices) or indirect (e.g., wired and/or wireless connections between any number of devices connecting the operatively connected devices) connection.

In general, embodiments of the invention relate to systems and methods for generating backup schedule recommendations for containers that are experiencing alert events more frequently than their existing backup frequency. In one embodiment of the invention, a container manager, of a container server, provides container event entries to other software instances to be analyzed. And, in turn, in one or more embodiments of the invention, a scheduling agent is configured to receive and analyze event entries to detect the occurrence of repeating alert events. If the scheduling agent identifies a pattern of repeating alert events, the scheduling agent then compares the existing backup frequency with the frequency of alert events. If the frequent of alert events is greater than the existing backup frequency, the scheduling agent provides a backup schedule recommendation to a user interface with a recommended backup frequency that is sufficient to maintain the integrity of the container data in view of the repeating alert events.

Figure 1:
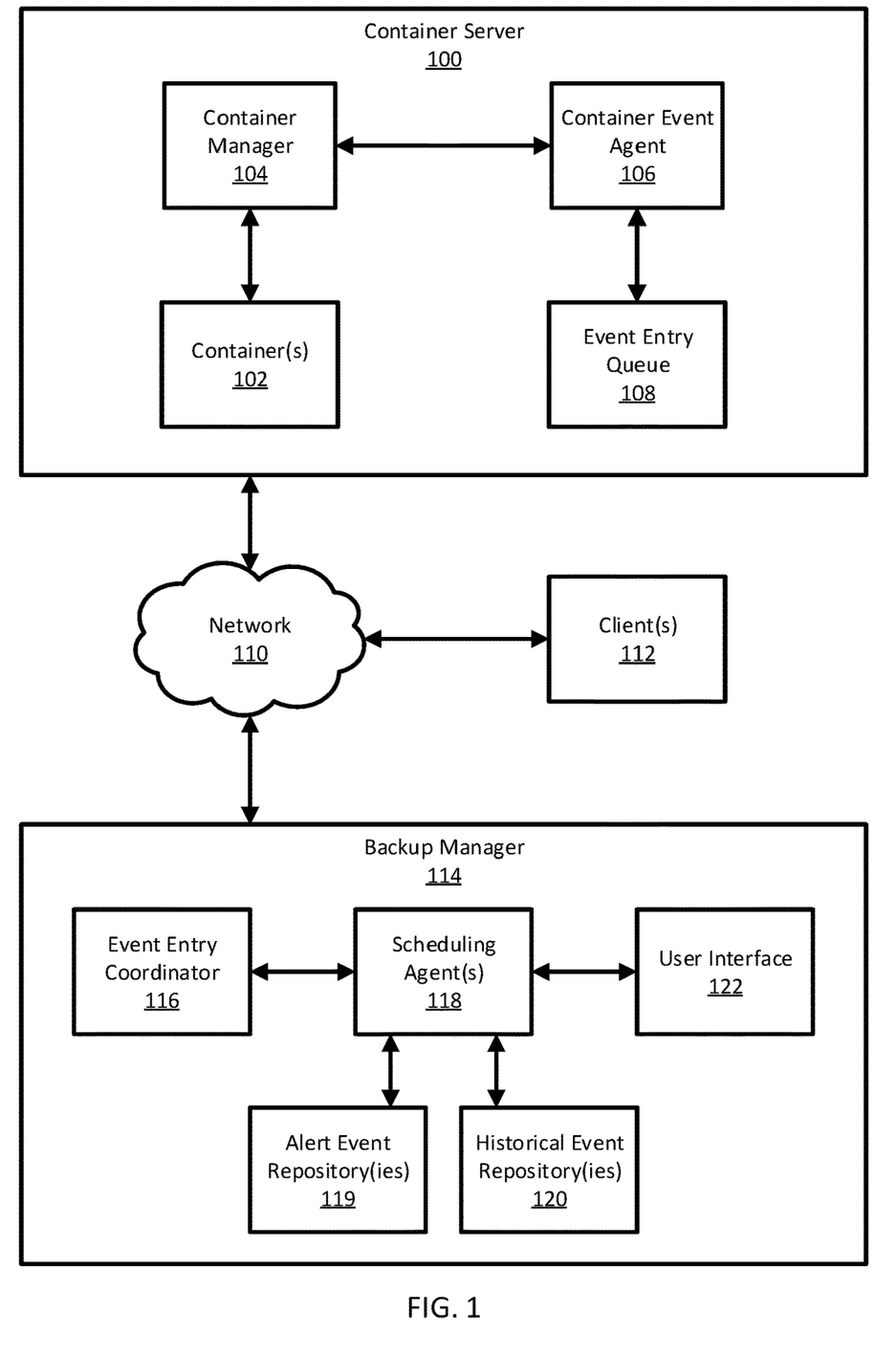
FIG. 1 shows a diagram of a system, in accordance with one or more embodiments of the invention.

FIG. 1 shows a diagram of a system, in accordance with one or more embodiments of the invention. The system may include a network (110), operatively connected to a container server (100), one or more client(s) (112), and a backup manager (114). Each of these components is described below.

In one or more embodiments of the invention, a network (e.g., network (110)) is a collection of connected network devices (not shown) that allow for the communication of data from one network device (not shown) to other network devices (not shown), or the sharing of resources among network devices (not shown). Examples of a network (e.g., network (110)) include, but are not limited to, a local area network (LAN), a wide area network (WAN) (e.g., the Internet), a mobile network, or any other type of network that allows for the communication of data and sharing of resources among network devices and/or devices operatively connected to the network (110). One of ordinary skill in the art, having the benefit of this detailed description, would appreciate that a network (e.g., network (110)) is collection of operatively connected devices that enables communication between those devices.

In one or more embodiments of the invention, a client (e.g., client(s) (112)) is implemented as a computing device. Each computing device may include one or more processors, memory (e.g., random access memory), and persistent storage (e.g., disk drives, solid state drives, etc.). The persistent storage may store computer instructions (e.g., computer code) which, when executed by the processor(s) of the computing device, cause the computing device to issue one or more requests and to receive one or more responses. Examples of a computing device include a mobile phone, tablet computer, laptop computer, desktop computer, server, distributed computing system, or cloud resource. In one or more embodiments of the invention, a client (e.g., client(s) (112)) may be implemented as a logical device. The logical device may utilize the computing resources of any number of computing devices (defined above).

In one or more embodiments of the invention, a computing device includes a communication interface (not shown). In one or more embodiments of the invention, a communication interface is a hardware component that provides capabilities to interface a computing device with one or more devices (e.g., through a network to another client, another server, a network of devices, etc.) and allow for the transmission and receipt of data with those devices. A communication interface may communicate via any suitable form of wired interface (e.g., Ethernet, fiber optic, serial communication etc.) and/or wireless interface and utilize one or more protocols for the transmission and receipt of data (e.g., Transmission Control Protocol (TCP)/Internet Protocol (IP), Remote Direct Memory Access (RDMA), Institute of Electrical and Electronics Engineers (IEEE) 801.11, etc.).

In one or more embodiments of the invention, a container server (e.g., container server (100)) is hardware configured to manage, provide resources to, and/or execute one or more container(s) (e.g., container(s) (102)), execute corresponding software (e.g., 104, 106), and/or store corresponding data structure(s) (e.g., 108). In one or more embodiments of the invention, a container server (e.g., container server (100)) is implemented as a computing device and includes one or more container(s) (102), a container manager (104), a container event agent (106), and an event entry queue (108). Each of these components is described below.

In one or more embodiments of the invention, a container (e.g., container(s) (102)) is software executing on the container server (100). In one embodiment of the invention, a container (e.g., container(s) (102)) may be an independent software instance that executes within, or is managed by, a container manager (104). In one embodiment, where a container (e.g., container(s) (102)) is executing as an isolated software instance, the container (e.g., container(s) (102)) may establish a semi-isolated virtual environment, inside the container (e.g., container(s) (102)), in which to execute one or more applications. In one embodiment of the invention, an application is software executing within a container (e.g., container(s) (102)), that may include instructions which, when executed by a processor(s), initiate the performance of one or more operations of hardware components (not shown) of the container server (100). In one embodiment of the invention, a container (e.g., container(s) (102)) may be executing in "user space" (e.g., a layer of software that utilizes low-level system components for the execution of applications) of an operating system of the container server (100).

In one or more embodiments of the invention, a container manager (e.g., container manager (104)) is software executing on the container server (100). In one embodiment of the invention, a container manager (e.g., container manager (104)) may be software that directly executes within the user space of a computing device and allows for the creation, maintenance, and/or configuration of one or more container(s) (e.g., container(s) (102)). As an example, a container manager (e.g., container manager (104)) may be an instance of Docker® or Kubernetes®. In one embodiment of the invention, a container manager (104) is configured to serve information about itself and/or one or more container(s) (e.g., containers (102)) (e.g., event entries) to one or more requesting entities (e.g., container event agent (106)). A container manager may provide information using a specified protocol that other hardware devices and/or software instances may be configured to interact with. As an example, a container manager (e.g., container manager (104)) may utilize an application programming interface (API) to accept a query and return certain data based on that query.

In one or more embodiments of the invention, a container event agent (e.g., container event agent (106)) is software executing on the container server (100). In one embodiment of the invention, a container event agent (e.g., container event agent (106)) is configured to execute one or more process(es) to obtain event entries from the container manager (e.g., container manager (104)). In one or more embodiments of the invention, a container event agent (e.g., container event agent (106)) may utilize an API to request and/or receive event entries from the container manager (e.g., container manager (104)). A container event agent (e.g., container event agent (106)) may perform some or all of the method shown in FIG. 4.

In one or more embodiments of the invention, an event entry queue (e.g., event entry queue (108)) is a data structure that includes one or more event entries (not shown). More detail regarding the event entry queue (e.g., event entry queue (108)) may be found in the description of FIG. 2.

In one or more embodiments of the invention, a backup manager (e.g., backup manager (114)) is hardware configured to manage, provide resources to, and/or execute one or more scheduling agent(s) (e.g., scheduling agent(s) (118)), execute corresponding software (e.g., 116, 122), and/or store corresponding data structure(s) (e.g., 119, 120). In one or more embodiments of the invention, a backup manager (e.g., backup manager (114)) is implemented as a computing device and includes an event entry coordinator (116), one or more scheduling agent(s) (118), one or more alert event repository(ies) (119), one or more historical event repository(ies) (120), and a user interface (122). Each of these components is described below.

In one or more embodiments of the invention, an event entry coordinator (e.g., event entry coordinator (116)) is software executing on the backup manager (114). In one embodiment of the invention, an event entry coordinator (e.g., event entry coordinator (116)) may be configured to receive event entries from a container event agent (e.g., container event agent (106)) stored in an event entry queue (e.g., event entry queue (108)). In one or more embodiments of the invention, an event entry coordinator (e.g., event entry coordinator (116)) includes one or more ports (not shown) for receiving event entries. In one or more embodiments of the invention, a port is a logical communication endpoint that allows software to associate data received at a particular port as being a particular type of data and/or associated with a particular type of process. In one or more embodiments of the invention, an event entry coordinator (e.g., event entry coordinator (116)) may be pre-populated with a sparse number of ports, which may be individually allocated and uniquely associated with a single container (e.g., container(s) (102)). An event entry coordinator (e.g., event entry coordinator (116)) may perform some or all of the method shown in FIG. 5.

In one or more embodiments of the invention, a scheduling agent (e.g., scheduling agent(s) (118)) is software executing on the backup manager (114). In one embodiment of the invention, a scheduling agent (e.g., scheduling agent(s) (118)) is configured to receive event entries from an event entry coordinator (e.g., event entry coordinator (116)), store those event entries in one or more historical event repository(ies) (e.g., historical event repository(ies) (120)), read data from one or more alert event repository(ies) (e.g., alert event repository(ies) (119)), and provide information to a user interface (e.g., user interface (122)). A scheduling agent (e.g., scheduling agent(s) (118)) may perform some or all of the method shown in FIG. 6.

In one or more embodiments of the invention, an alert event repository (e.g., alert event repository(ies) (119)) is a data structure that includes alert event data (not shown). In one or more embodiments of the invention, alert event data is a type of event data (discussed in the description of FIG. 2) associated with certain events that indicate unstable, problematic, or otherwise malfunctioning operations of a container (e.g., container(s) (102) (i.e., a "container error"). In one or more embodiments of the invention, an alert event repository (e.g., alert event repository(ies) (119)) may include alert event data that is added by one or more user(s) (e.g., client(s) (112)) of the backup manager (114) and/or automatically generated by one or more components of the system of FIG. 1.

In one or more embodiments of the invention, an alert event repository (e.g., alert event repository(ies) (119)) may be uniquely associated with a single container (e.g., container(s) (102)). Further, in one embodiment of the invention where each scheduling agent (e.g., scheduling agent(s) (118)) is uniquely associated with a single container (e.g., container(s) (102)), the scheduling agent (e.g., scheduling agent(s) (118)) may only search the single alert event repository (e.g., alert event repository(ies) (119)) associated with the same container (e.g., container(s) (102)) for alert event data.

In one or more embodiments of the invention, each scheduling agent (e.g., scheduling agent(s) (118)) may be uniquely associated with an alert event repository (e.g., alert event repository(ies) (119)), where multiple scheduling agents (e.g., scheduling agent(s) (118)) may be associated with a single container (e.g., container(s) (102)).

In one or more embodiments of the invention, an alert event repository (e.g., alert event repository(ies) (119)) may be associated with (and store) alert event data of a particular type (e.g., critical errors, warnings, minor exceptions, etc.). Thus, in such embodiments, different alert event repositories (e.g., historical event repository(ies) (120)) may be searched by a scheduling agent (e.g., scheduling agent(s) (118)) depending on the type of alert data of interest.

In one or more embodiments of the invention, a historical event repository (e.g., historical event repository(ies) (120)) is a data structure that includes one or more event entries (not shown). In one or more embodiments of the invention, a historical event repository (e.g., historical event repository(ies) (120)) is substantially similar to the event entry queue (108) (described in more detail in the discussion of FIG. 2) except that a historical event repository (e.g., historical event repository(ies) (120)) includes only event entries with event data that match one or more alert events (as discussed in more detail in the description of FIG. 6).

In one or more embodiments of the invention, a user interface (e.g., user interface (122)) is software executing on the backup manager (114). In one embodiment of the invention, a user interface (e.g., user interface (122)) may be software that allows one or more user(s) (e.g., client(s) (112)) of the backup manager (114) to interact, view, and/or control data stored and/or otherwise obtained by the backup manager (114). A user interface (e.g., user interface (122)) is described in more detail in the discussion of FIG. 3.

While FIG. 1 shows a specific configuration of a system, other configurations may be used without departing from the scope of the invention. For example, although each software instance (102, 104, 106) of the container server (100) is shown to be executing within the single container server (100), each software instance (102, 104, 106) may execute independently and/or in some combination on different hardware devices operatively connected via a network (e.g., network (110)). Similarly, although each software instance (116, 118, 120, 122) of the backup manager (114) is shown to be executing within the single backup manager (114), each software instance (116, 118, 120, 122) may execute independently and/or in some combination on different hardware devices operatively connected via a network (e.g., network (110)). Alternatively, in one or more embodiments of the invention, each software instance (102, 104, 106, 116, 118, 120, 122) and data structure (108, 119, 120) may execute and exist on the same hardware device. Accordingly, embodiments disclosed herein should not be limited to the configuration of devices and/or components shown in FIG. 1.

Figure 2:
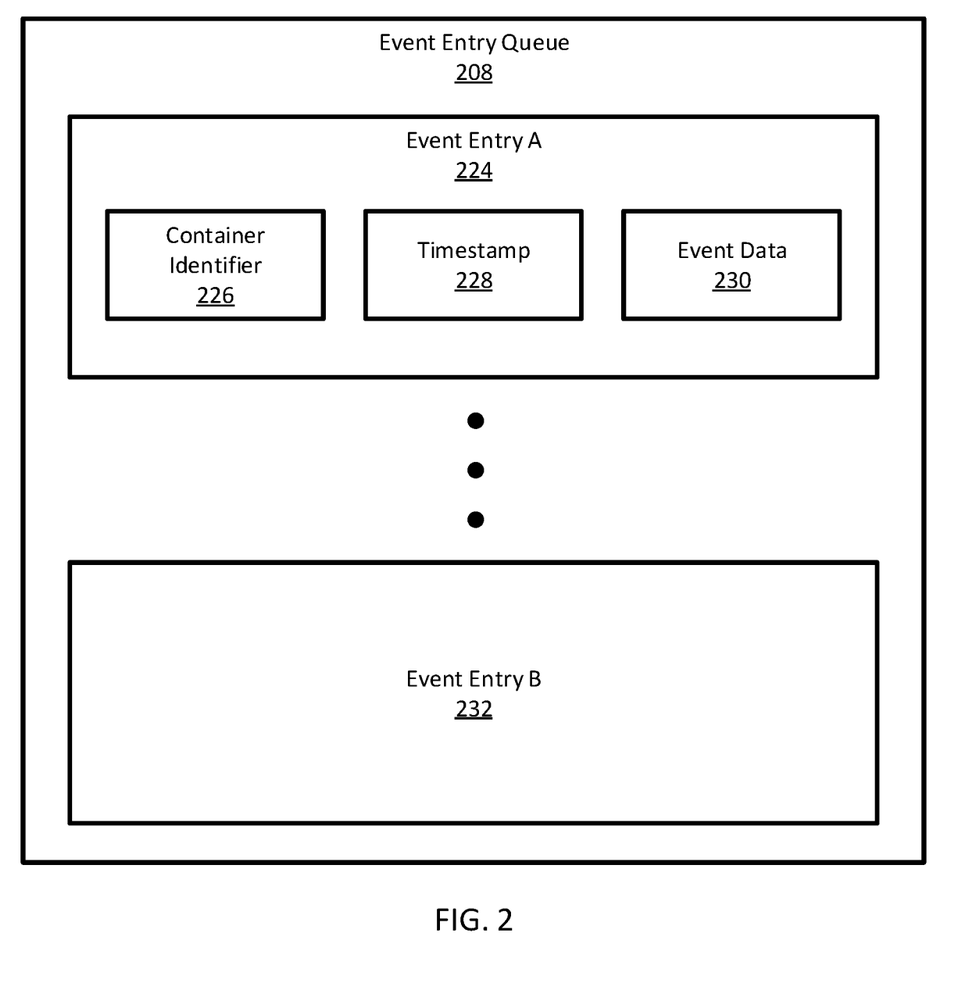
FIG. 2 shows a diagram of an event entry queue, in accordance with one or more embodiments of the invention.

FIG. 2 shows a diagram of an event entry queue, in accordance with one or more embodiments of the invention. In one or more embodiments of the invention, an event entry queue (e.g., event entry queue (208)) is a data structure that includes one or more event entry(ies) (e.g., event entry A (224), event entry B (232)). In one or more embodiments of the invention, an event entry queue (e.g., event entry queue (208)) may act as a buffer (stored in local memory (not shown) of the container server (not shown)) to temporarily store event entries (e.g., 224, 232) prior to those event entries being sent and stored elsewhere. In one or more embodiments of the invention, an event entry (e.g., event entry A (224), event entry B (232)) is a data structure that includes a container identifier (226), a timestamp (228), and event data (230). Each of these components is described below.

In one or more embodiments of the invention, a container identifier (e.g., container identifier (226)) is an alphanumeric expression associated with a container. The alphanumeric expression may be encoded using a standard protocol for alphanumeric characters (e.g., Unicode, American Standard Code for Information Interchange (ANSII), etc.). In one embodiment of the invention, a container identifier (e.g., container identifier (226)) may be provided by a user of a container server in which the corresponding container was created. In one embodiment of the invention, a container identifier (e.g., container identifier (226)) may be a string of text that uniquely identifies that container to one or more users (e.g., "web_server_3", "engineering apps", "data manager", etc.). Alternatively, in one embodiment of the invention, a container identifier (e.g., container identifier (226)) may be automatically generated by one or more container servers at the time when the container was initially created (e.g., "container06", "120492", etc.). One of ordinary skill in the art, having the benefit of this detailed description, would appreciate that a container identifier may be any alphanumeric expression that is unique to the associated container.

In one or more embodiments of the invention, a timestamp (e.g., timestamp (228)) is an alphanumeric or numeric-only expression that specifies a time. As a non-limiting example, a timestamp (e.g., timestamp (228)) may specify the year, month, day, hour, minute, and second in numerical form (e.g., "20200323_143752" indicating Mar. 23, 2020 at 2:37:52 pm). Further, in one or more embodiments of the invention, a timestamp (e.g., timestamp (228)) may specify a time zone (e.g., "Central Standard Time" (CST)) and/or additional smaller increments of time (e.g., centiseconds, milliseconds, etc.). In one embodiment of the invention, a timestamp (e.g., timestamp (228)) may measure time from a known offset other than year 0 AD (e.g., "Unix time" is measured in seconds from midnight Jan. 1, 1970 Coordinated Universal Time (UTC)). One of ordinary skill in the art, having the benefit of this detailed description, would appreciate that a timestamp may be any alphanumeric expression that indicates a time.

In one or more embodiments of the invention, event data (e.g., event data (230)) is an alphanumeric expression associated with an event of a container (the container specified by the container identifier (226) of the same event entry (224)). The alphanumeric expression may be encoded using a standard protocol for alphanumeric characters (e.g., Unicode, American Standard Code for Information Interchange (ANSII), etc.).

In one embodiment of the invention, event data (e.g., event data (230)) is data that relates to one or more processes of a container that have occurred, or have failed to occur. Examples of events include, but are not limited to, unexpected shutdowns, operation failures (e.g., failure to complete process, exceptions), resource utilization metrics, data read/write errors, operational statuses, connectivity errors, operation successes, etc.

Correspondingly, event data (e.g., event data (230)) includes one or more text string(s) that specify one or more event(s). Non-limiting examples of event data (e.g., event data (230)) include "read_success", "unexpected_shutdown", "SysMemFull", "backup_completed", "Operations-Normal", "server5_unreachable", "fileFoo_unreadable", etc. One of ordinary skill in the art, having the benefit of this detailed description, would appreciate that event data may be any alphanumeric expression that adequately specifies an event.

As discussed in the description of FIG. 1, alert event data is a type of event data (e.g., event data (230)) associated with certain events that indicate unstable, problematic, or otherwise malfunctioning operations of a container. Non-limiting examples of alert event data (from the examples of event data above) include "unexpected_shutdown", "SysMemFull", "server5_unreachable", and "fileFoo_unreadable" as these event data indicate alert events.

As a non-limiting example, an entire event entry (e.g., 224, 232) may be "web_server_3.20200512_031234.unexpected_shutdown". Using this example, one or more other software instances may utilize the event entry to identify that the container labeled and/or identified as "web_server_3" experienced an unexpected shutdown (i.e., an event) on May 12, 2020 at 3:12:34 am (i.e., a date and time).

While FIG. 2 shows a specific configuration of an event entry queue, other configurations may be used without departing from the scope of the invention. Accordingly, embodiments disclosed herein should not be limited to the configuration of devices and/or components shown in FIG. 2.

Figure 3:
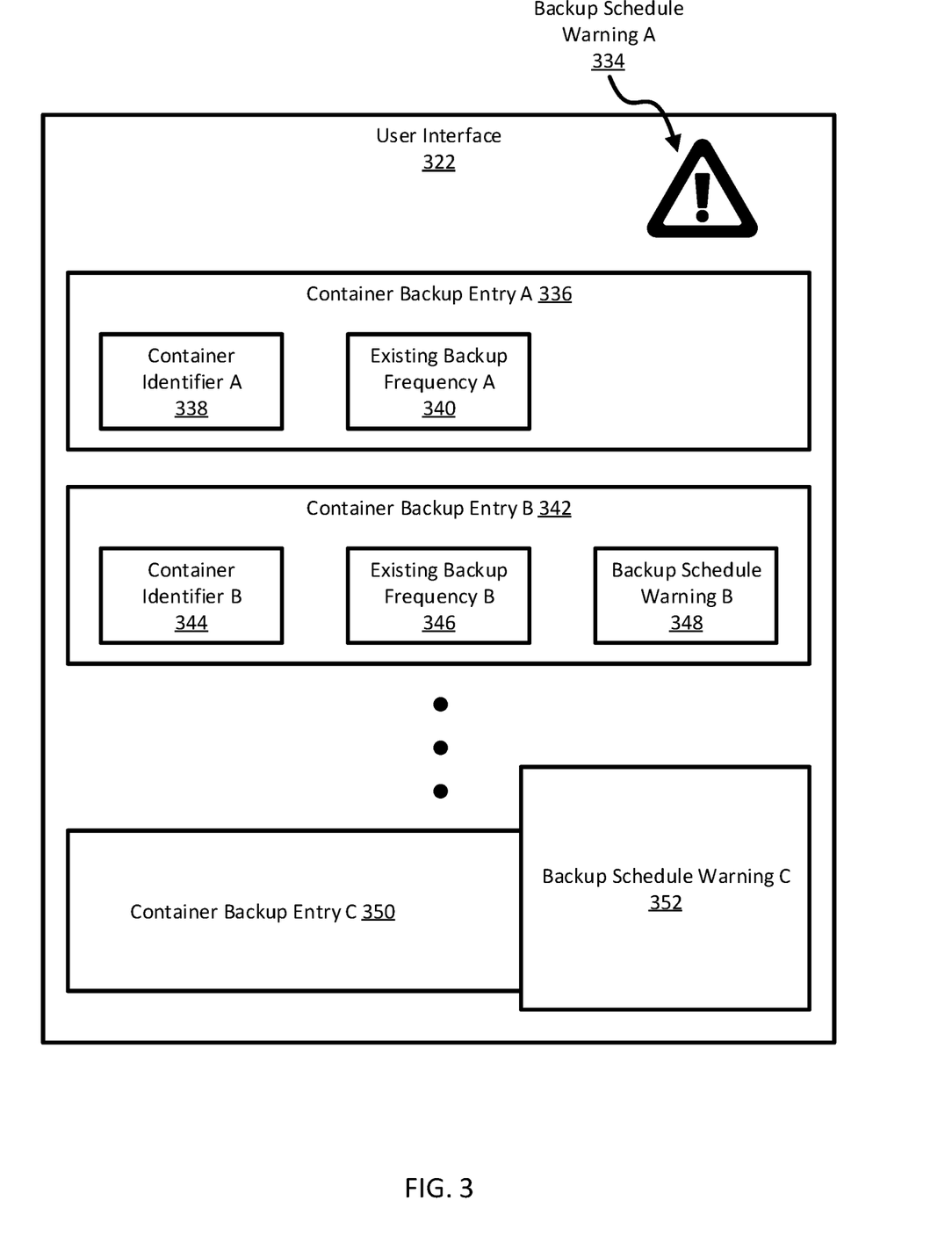
FIG. 3 shows an example of a user interface, in accordance with one or more embodiments of the invention.

FIG. 3 shows an example of a user interface, in accordance with one or more embodiments of the invention. In one embodiment of the invention, a user interface (e.g., user interface (322)) may be software that generates one or more visual elements (i.e., the components of user interface (322)) and allows one or more user(s) of the backup manager to interact, view, and/or control data obtained by the backup manager. In one embodiment of the invention, a user interface (e.g., user interface (322)) includes one or more container backup entry(ies) (e.g., container backup entry A (336), container backup entry B (342), container backup entry C (350)) and/or one or more backup schedule warning(s) (e.g., backup schedule warning A (334), backup schedule warning B (348), backup schedule warning C (352), etc.). Each of these components is described below.

In one or more embodiments of the invention, a container backup entry (e.g., container backup entry A (336), container backup entry B (342), container backup entry C (350)) is a visual representation of an underlying container backup entry data structure. In one embodiment of the invention, an underlying container backup entry data structure includes a container identifier (e.g., 338, 344) and an existing backup frequency (e.g., 340, 346). Further, in one embodiment of the invention, an underlying container backup entry data structure may further include a backup schedule warning (e.g., 334, 348, 352) if a backup schedule warning (e.g., 334, 348, 352) has been generated and associated with a container identifier (e.g., 338, 344) (e.g., resulting from the method FIG. 6). Accordingly, in one or more embodiments of the invention, a container backup entry (e.g., 336, 342, 350) includes and/or provides graphical visual elements of a container identifier (338, 344), an existing backup frequency (340, 346), and/or a backup schedule warning (334, 348, 352), each described below.

In one or more embodiments of the invention, a container identifier (e.g., container identifier A (338), container identifier B (344)) has all of the same properties and purpose as discussed in the description of FIG. 2 (e.g., container identifier (226)).

In one or more embodiments of the invention, an existing backup frequency (e.g., existing backup frequency A (340), existing backup frequency B (346)) is a measurement of the time between scheduled backup operations for an associated container (i.e., a "container backup schedule"). A backup operation may include duplicating (i.e., copying, replicating, etc.) data used, maintained, and/or modified by the associated container and preserving the duplicated data in the event that the original data is lost, corrupted, and/or inaccessible.

In one or more embodiments of the invention, a backup frequency is a constant duration of time between scheduled backup operations. As a non-limiting example, backup operations for a container may be scheduled to occur at the same time every week (i.e., every seven days) or the same time every day (i.e., every 24 hours). Alternatively, backup frequency may be a variable duration of time. As a non-limiting example, backup operations for a container may be scheduled to occur on the same day of every month (i.e., every 28-31 days). In one or more embodiments of the invention, where a backup frequency is not a constant duration of time, the backup frequency may be rounded up to the largest possible duration between backups (e.g., 31 days for a once-per-month backup) to provide a constant duration of time as the backup frequency.

In one or more embodiments of the invention, a backup schedule warning (e.g., backup schedule warning A (334), backup schedule warning B (348), backup schedule warning C (352)) is data that provides information to a user of the user interface (322) that an alert event frequency for a specified container is greater (i.e., more frequent) than the existing backup frequency (e.g., 340, 346) for that container. In one or more embodiments of the invention, the backup schedule warning (e.g., 334, 348, 352) includes and/or provides a visual representation of a container identifier (e.g., 338, 344), the existing backup frequency (e.g., 340, 346), the alert event frequency (i.e., "error frequency"), and/or a recommended backup schedule with a corresponding recommended backup frequency that is greater (i.e., more frequent) than the alert event frequency.

In one or more embodiments of the invention, a backup schedule warning (e.g., 334, 348, 352) may be displayed inside a container backup entry (e.g., container backup entry B (342) and backup schedule warning B (348)). In one embodiment of the invention, a backup schedule warning (e.g., 334, 348, 352) may be displayed outside of a container backup entry (e.g., 336, 342, 350). For example, as shown in FIG. 3, backup schedule warning A (334) is shown at the top of the user interface (322) and backup schedule warning C (352) is shown to be located at the bottom-right of the user interface (322). In one or more embodiments of the invention, a backup schedule warning (e.g., 334, 348, 352) may have different properties than other graphical elements of the user interface (322). For example, backup schedule warning C (352) may be a "sticky" popup that maintains its position in the bottom-right corner of the user interface (322) when a user of the user interface (322) scrolls up or down the user interface (322) to view the list of container backup entries (e.g., 336, 342, 350). As another example, backup schedule warning A (334) may alternate between contrasting colors (e.g., red and black) to attract the attention of one or more user(s) (e.g., client(s)).

In one or more embodiments of the invention, a backup schedule warning (e.g., 334, 348, 352) may provide one or more interactive elements (e.g., buttons, links, etc.) that allow the user (e.g., client) to implement the recommended backup schedule specified in the backup schedule warning and/or navigate the user (e.g., client) to another user interface (not shown) where the existing backup frequency (e.g., 340, 346) for the container can be modified. Additionally, in one or more embodiments of the invention, a backup schedule warning (e.g., 334, 348, 352) may provide information to a user of the user interface (322) that the recommended backup schedule was implemented (i.e., the existing backup schedule was overwritten), even without that user's confirmation.

While FIG. 3 shows an example configuration of a user interface, other configurations may be used without departing from the scope of the invention. Accordingly, embodiments disclosed herein should not be limited to the configuration of devices and/or components shown in FIG. 3.

Figure 4:
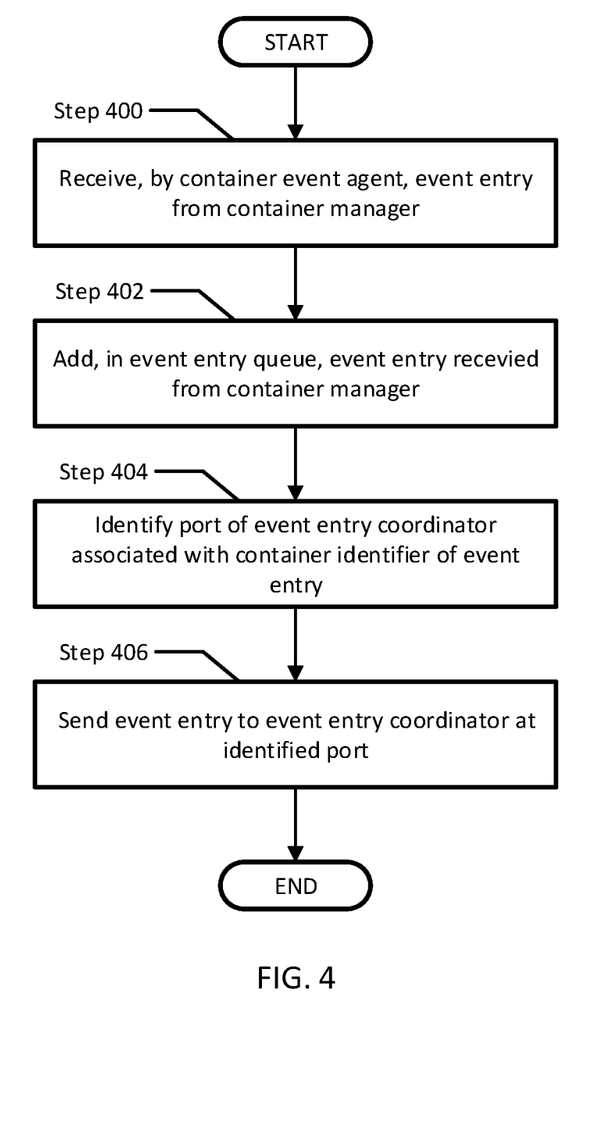
FIG. 4 shows a flowchart of a method of obtaining event data, in accordance with one or more embodiments of the invention.

FIG. 4 shows a flowchart of a method of obtaining event data, in accordance with one or more embodiments of the invention. All or a portion of the method shown in FIG. 4 may be performed by one or more components of the container event agent. However, another component of the system may perform this method without departing from the invention. While the various steps in this flowchart are presented and described sequentially, one of ordinary skill in the relevant art will appreciate that some or all of the steps may be executed in different orders, may be combined or omitted, and some or all steps may be executed in parallel.

In Step 400, a container event agent receives an event entry from a container manager. In one or more embodiments of the invention, the container event agent receives event data from the container manager by utilizing an API offered by the container manager that enables the exchange of requests and data between the container manager and other software instances.

In one embodiment of the invention, a container event agent is configured to receive all event entries that the container manager obtains, creates, and/or generates. For example, a container manager may be configured to send all event entries (acquired while managing one or more container(s)) to the container event agent. As another example, in one embodiment of the invention, a container event agent may be configured to request and receive all event entries from a container manager. Alternatively, in one embodiment of the invention, a container manager and/or container event agent may be configured to send and/or request only certain event entries based on one or more condition(s) specified by either software instance.

In Step 402, the container event agent adds the event entry, received from the container manager, to an event entry queue. In one or more embodiments of the invention, the container event agent adds two or more event entries to the event entry queue in the order that the event entries were received (i.e., regardless of which container the event entry is associated with). Alternatively, in one embodiment of the invention, the container event agent adds the event entry to event entry queue in the first region of available memory.

In Step 404, the container event agent identifies a port of the event entry coordinator associated with the container identifier. In one or more embodiments of the invention, the container event agent maintains a data structure (e.g., table) of container identifiers and corresponding ports of the event entry coordinator. Accordingly, in one embodiment of the invention, the port corresponding to a container identifier may be identified by performing a lookup in the data structure to identify the corresponding port based on container identifier of the event entry.

In one embodiment of the invention, the container event agent generates the associations between ports and container identifiers by assigning a unique available port (of the event entry coordinator) to each container identifier. For example, when a previously unknown container identifier is received in an event entry by the container event agent, an available port of the event entry coordinator may be assigned to that new container identifier without interaction from the event entry coordinator. Alternatively, in one embodiment of the invention, the event entry coordinator may send a data structure that indicates the association between ports and container identifiers to the container event agent and may further send updates when modifications to that data structure are made.

In Step 406, the container event agent sends the event entry to the event entry coordinator at the port identified in Step 404. In one or more embodiments of the invention, the event entry is sent from a communication interface of the container server (on which the container event agent is executing) through a network to a communication interface of the backup manager (on which the event entry coordinator is executing).

In one or more embodiments of the invention, the container event agent sends the event entry to the event entry coordinator using a unique address (and identified port) of event entry coordinator (and/or backup manager on which the event entry coordinator is executing) (e.g., an IP address) accessible via a WAN (e.g., the internet) or within a LAN. In one embodiment of the invention, the unique address of the event entry coordinator may be a domain name (or subdomain) specific to the event entry coordinator (e.g., "backup7.example.com") thereby providing a more durable WAN address of the event entry coordinator and/or backup manager.

Figure 5:
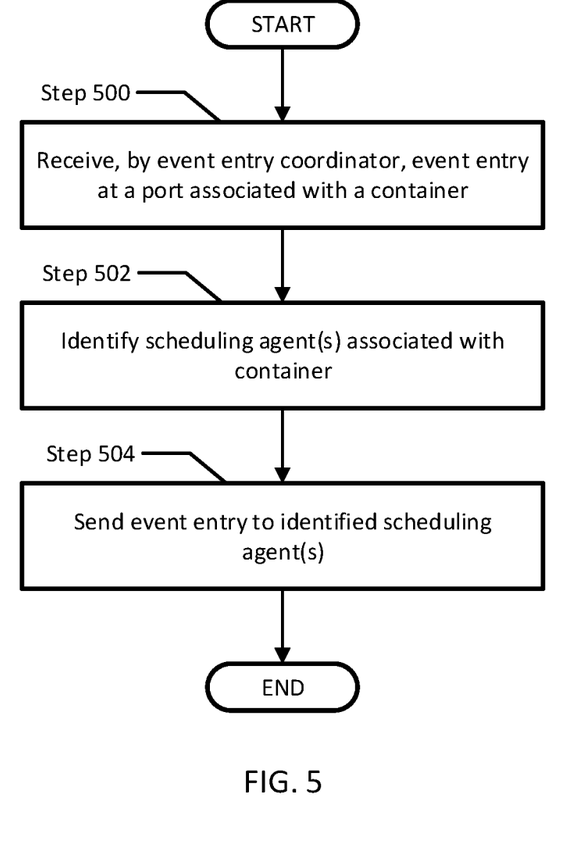
FIG. 5 shows a flowchart of a method of directing event entries, in accordance with one or more embodiments of the invention.

FIG. 5 shows a flowchart of a method of directing event entries, in accordance with one or more embodiments of the invention. All or a portion of the method shown in FIG. 5 may be performed by one or more components of the event entry coordinator. However, another component of the system may perform this method without departing from the invention. While the various steps in this flowchart are presented and described sequentially, one of ordinary skill in the relevant art will appreciate that some or all of the steps may be executed in different orders, may be combined or omitted, and some or all steps may be executed in parallel.

In Step 500, an event entry coordinator receives an event entry, from a container event agent, at a port. In one or more embodiments of the invention, the event entry is received by the event entry coordinator by a communication interface of the backup manager (on which the event entry coordinator is executing) through a network from a communication interface of a container server (on which the container event agent is executing). In one or more embodiments of the invention, the port on which the event entry was received is uniquely associated with a container. Accordingly, by receiving an event entry on a port, the event entry coordinator does not have to read, parse, lookup, sort, and/or otherwise analyze the event entry to associate the event entry with a container.

In Step 502, the event entry coordinator identifies one or more scheduling agent(s) associated with the event entry (e.g., via an associated container, container identifier, and/or port). In one or more embodiments of the invention, the event entry coordinator and one or more scheduling agent(s) send and receive data utilizing a "publish-subscribe" messaging pattern. For example, in one embodiment of the invention, one or more scheduling agent(s) may "subscribe" to receive event entries associated with a container (e.g., via a container identifier and/or port). In turn, the event entry coordinator may maintain a data structure that specifies the associations between container identifier (and/or ports) and one or more scheduling agent(s). Thus, when the event entry coordinator "publishes" a new event entry (once received from the container event agent), the event entry coordinator may identify the scheduling agent(s) "subscribed" to the associated container.

In Step 504, the event entry coordinator sends the event entry (received in Step 500) to each scheduling agent identified in Step 502. In one or more embodiments of the invention, there is only one scheduling agent associated with each container; thus, the event entry coordinator may be configured to send two or more event entries, in parallel, to a respective number of scheduling agents associated with different containers without having to buffer those event entries. For example, if the event entry coordinator receives three different event entries on three different ports in short succession, the event entry coordinator may send those three event entries to three separate scheduling agents (respectively associated with the containers identified in the event entries) in parallel (or nearly parallel) due to the association of each event entry with only a single scheduling agent.

Figure 6:
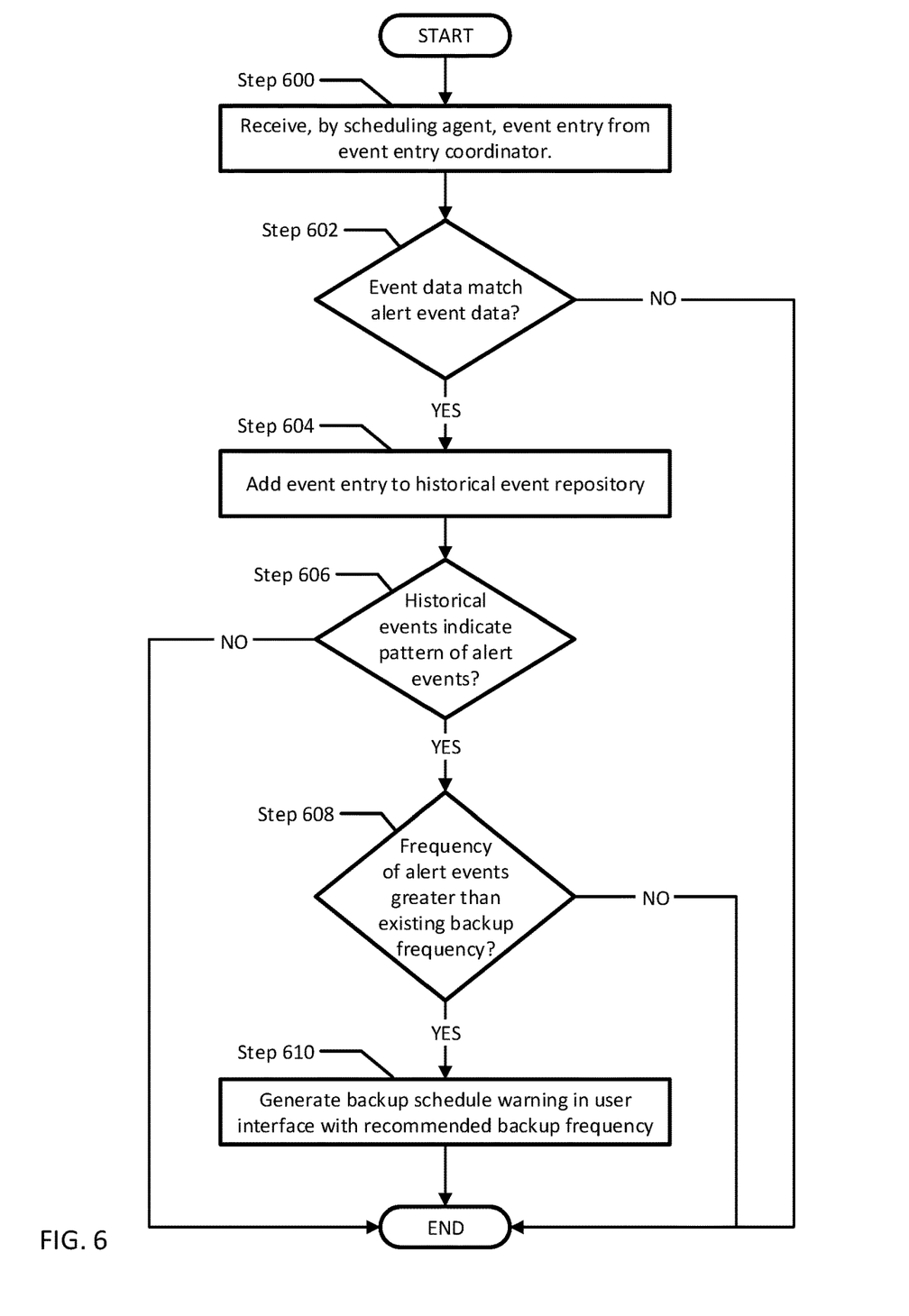
FIG. 6 shows a flowchart of a method of generating a backup schedule warning, in accordance with one or more embodiments of the invention.

FIG. 6 shows a flowchart of a method of generating a backup schedule warning, in accordance with one or more embodiments of the invention. All or a portion of the method shown in FIG. 6 may be performed by one or more components of a scheduling agent. However, another component of the system may perform this method without departing from the invention. While the various steps in this flowchart are presented and described sequentially, one of ordinary skill in the relevant art will appreciate that some or all of the steps may be executed in different orders, may be combined or omitted, and some or all steps may be executed in parallel.

In Step 600, a scheduling agent receives an event entry from the event entry coordinator. In one or more embodiments of the invention, the scheduling agent is configured to receive only event entries associated with a particular container thereby causing that scheduling agent to process and/or analyze event entries of only a single container. Alternatively, in one or more embodiments of the invention, a scheduling agent may be associated with two or more container(s) and therefore perform additional steps to segregate event entries associated with different containers, when received.

In Step 602, the scheduling agent determines if the event data (of the event entry received in Step 600) matches alert event data in an alert event repository. In one or more embodiments of the invention, the scheduling agent parses the event data from the event entry and compares the event data with the alert event data in the alert event repository. The scheduling agent may perform a comparison via string search, or partial string search, to identify alert event data that matches the event data of the received event entry.

In one or more embodiments of the invention, as discussed in the description of FIG. 1, each alert event repository may be uniquely associated with a single container. Further, in one embodiment of the invention where each scheduling agent is uniquely associated with a single container, the scheduling agent only searches that single alert event repository for alert event data. Alternatively, in one or more embodiments of the invention, each scheduling agent may be uniquely associated with an alert event repository, where multiple scheduling agents are associated with each container (e.g., each searching for differing levels of severity and/or types of errors, warnings, malfunctions, etc.).

In one embodiment of the invention, continuing with the example provided in FIG. 2, if the event entry is "web_server_3.20200512_031234.unexpected_shutdown", the scheduling agent searches the alert event repository for the event data portion of the event entry (i.e., "unexpected_shutdown"). Further, the scheduling agent may be configured to search for and identify identical, partial, and/or similar alert event data matching the event data (e.g., "unexpected_shutdown", "improper shutdown", "unscheduled shutdown, etc.).

If it is determined that the event data does not match an alert event (602—NO), the process end. Alternatively, if it is determined that the event data matches an alert event (602—YES), the process proceeds to Step 604.

In Step 604, the event entry, that includes event data matching alert event data, is added to a historical event repository. In one or more embodiments of the invention, the historical event repository already includes event entries that were previously added (i.e., "historical event entries"). In one embodiment of the invention, once the event entry, received in Step 500, is added to the historical event repository, the event entry may then be considered a "historical event entry".

In one or more embodiments of the invention, as discussed in the description of FIG. 1, each scheduling agent may maintain its own unique historical event repository thereby obviating the need to make any further determinations regarding the container and/or container identifier.

In Step 606, the scheduling agent determines if the historical events, indicated by two or more historical event entries of the historical event repository indicate a pattern of alert events. In one or more embodiments of the invention, where the historical event repository includes only a single historical event entry, the scheduling agent may not be able to determine a pattern of alert events. Alternatively, in one or more embodiments of the invention, where the historical event repository includes two or more alert event entries, the scheduling agent is configured to determine if the events specified by the historical event entries, and the times at which they occurred, indicate a pattern of alert events (i.e., a "repeating error state") and the frequency at which the alert events occur (i.e., "frequency of alert events", "error frequency").

As a non-limiting example, in one embodiment of the invention, consider a scenario where the historical event repository includes five historical event entries, each including event data specifying an improper shutdown event and timestamps indicating each shutdown occurred approximately ten minutes apart. When analyzing this data, the scheduling agent may be configured to determine that the historical events (specified by the historical event entries) indicate a pattern of alert events; specifically, a repeating cycle of improper shutdowns approximately every ten minutes.

As another non-limiting example, in one embodiment of the invention, consider a scenario where the historical event repository includes three historical event entries, each including event data that specifies an improper shutdown event. However, the three timestamps of the three historical event entries specify an irregular occurrence (e.g., four months ago, one week ago, one minute ago). When analyzing this data, the scheduling agent is configured to determine that the historical events (specified by the historical event entries) do not indicate a pattern of alert events. However, continuing with the example, if the scheduling agent were to receive a fourth event entry in six days indicating another improper shutdown, the scheduling agent may determine that the most recent three historical event entries indicate a pattern of alert events; specifically, a repeating cycle of improper shutdowns every six-to-seven days.

As another non-limiting example, in one embodiment of the invention, if the historical event repository includes three historical event entries, a first specifying a file read error, a second specifying a network connectivity error, and a third specifying a failure to complete an operation, where each event entry includes a timestamp all within a few seconds of each, the scheduling agent may determine that these three historical event entries all correspond to the same larger event (e.g., a temporary loss in network connectivity). Therefore, in such an example, the scheduling agent may determine that the historical event entries do not indicate a pattern of alert events.

If it is determined that the historical events do not indicate a pattern of alert events (606—NO), the process ends. Alternatively, if it is determined that the historical events indicate a pattern of alert events (606—YES), the process proceeds to Step 608.

In Step 608, the scheduling agent determines whether the frequency of alert events is greater than the existing backup frequency. In one or more embodiments of the invention, the scheduling agent may query an underlying container backup entry data structure (as discussed in the description of FIG. 3) to obtain the existing backup frequency for a specified container. Once obtained, the scheduling agent may perform a comparison to determine if the frequency of alert events is greater (i.e., occurring more frequently) than the existing backup frequency.

If it is determined that the frequency of alert events is not greater than the existing backup frequency (608—NO), the process ends. Alternatively, if it is determined that the frequency of alert events is greater than the existing backup frequency (608—YES), the process proceeds to Step 610.

In Step 610, the scheduling agent generates and issues a backup schedule warning to the user interface. As discussed in the description of FIG. 3, the backup schedule warning may be generated to include the container identifier, the existing backup frequency, the frequency of alert events, and a recommended backup frequency. Further, in one or more embodiments of the invention as discussed in the description of FIG. 3, the backup schedule warning may include a button or link to allow the user to change the backup frequency to the recommended backup frequency and/or navigate to a separate user interface where the backup frequency may be modified.

In one or more embodiments of the invention, the scheduling agent may update the container backup schedule to the recommended backup frequency without user input (i.e., overwrite the existing backup frequency with the recommended backup frequency). Accordingly, the backup schedule warning may be generated to include the container identifier and indicate that the backup frequency for the associated container was modified to the recommended backup frequency. In one or more embodiments of the invention, the backup schedule warning may be generated to include a button or link to allow the user to revert the changes to the container backup schedule (e.g., revert back to the existing backup frequency).

While one or more embodiments have been described herein with respect to a limited number of embodiments and examples, one of ordinary skill in the art, having the benefit of this detailed description, would appreciate that other embodiments can be devised which do not depart from the scope of the embodiments disclosed herein. Accordingly, the scope should be limited only by the attached claims.

What is claimed is:

1. A method for generating a container backup schedule to perform a backup, comprising:
receiving, by a scheduling agent, an event entry specifying an event associated with a container;
making a first determination that the event entry specifies an alert event;
adding, based on the first determination, the event entry to a plurality of historical event entries in a historical event repository;
making a second determination that the plurality of historical event entries indicates a repeating error state of the container;
making a third determination, based on the second determination, that an error frequency of the repeating error state is greater than an existing backup frequency of the container backup schedule;
generating, based on the third determination, a container backup schedule warning indicating a recommended backup frequency;
updating the container backup schedule from the existing backup frequency to the recommended backup frequency; and
performing the backup based on the container backup schedule.

2. The method of claim 1, wherein making the first determination that the event entry specifies the alert event comprises:
matching at least a portion of the event entry to alert event data associated with the alert event.

3. The method of claim 1, wherein the event entry indicates a container error at a first time, wherein the plurality of historical event entries comprises a second historical event entry that indicates a second container error at a second time.

4. The method of claim 3, wherein the error frequency is based on the first time and the second time.

5. The method of claim 4, wherein the recommended backup frequency is greater than the error frequency.

6. The method of claim 1, wherein generating the container backup schedule warning comprises:
issuing the container backup schedule warning to a user interface.

7. A non-transitory computer readable medium comprising instructions which, when executed by a computer processor, enables the computer processor to perform a method for generating a container backup schedule to perform a backup, comprising:
receiving, by a scheduling agent, an event entry specifying an event associated with a container;
making a first determination that the event entry specifies an alert event;
adding, based on the first determination, the event entry to a plurality of historical event entries in a historical event repository;
making a second determination that the plurality of historical event entries indicates a repeating error state of the container;
making a third determination, based on the second determination, that an error frequency of the repeating error state is greater than an existing backup frequency of the container backup schedule;
generating, based on the third determination, a container backup schedule warning indicating a recommended backup frequency;
updating the container backup schedule from the existing backup frequency to the recommended backup frequency; and
initiating the backup based on the container backup schedule.

8. The non-transitory computer readable medium of claim 7, wherein making the first determination that the event entry specifies the alert event comprises:
matching at least a portion of the event entry to alert event data associated with the alert event.

9. The non-transitory computer readable medium of claim 7, wherein the event entry indicates a container error at a first time, wherein the plurality of historical event entries comprises a second historical event entry that indicates a second container error at a second time.

10. The non-transitory computer readable medium of claim 9, wherein the error frequency is based on the first time and the second time.

11. The non-transitory computer readable medium of claim 10, wherein the recommended backup frequency is greater than the error frequency.

12. The non-transitory computer readable medium of claim 7, wherein generating the container backup schedule warning comprises:
issuing the container backup schedule warning to a user interface.

13. A backup manager, comprising:
memory; and
a processor, wherein the processor is configured to perform a method, comprising:
receiving, by a scheduling agent, an event entry specifying an event associated with a container;
making a first determination that the event entry specifies an alert event;
adding, based on the first determination, the event entry to a plurality of historical event entries in a historical event repository;
making a second determination that the plurality of historical event entries indicates a repeating error state of the container;
making a third determination, based on the second determination, that an error frequency of the repeating error state is greater than an existing backup frequency of a container backup schedule;
generating, based on the third determination, a container backup schedule warning indicating a recommended backup frequency;
updating the container backup schedule from the existing backup frequency to the recommended backup frequency; and
initiating a backup based on the container backup schedule.

14. The backup manager of claim 13, wherein making the first determination that the event entry specifies the alert event comprises:
matching at least a portion of the event entry to alert event data associated with the alert event.

15. The backup manager of claim 13, wherein the event entry indicates a container error at a first time, wherein the plurality of historical event entries comprises a second historical event entry that indicates a second container error at a second time.

16. The backup manager of claim 15, wherein the error frequency is based on the first time and the second time.

17. The backup manager of claim 16, wherein the recommended backup frequency is greater than the error frequency.

18. The backup manager of claim 13, wherein generating the container backup schedule warning comprises:

issuing the container backup schedule warning to a user interface.

\* \* \* \* \*